UNITED STATES PATENT OFFICE.

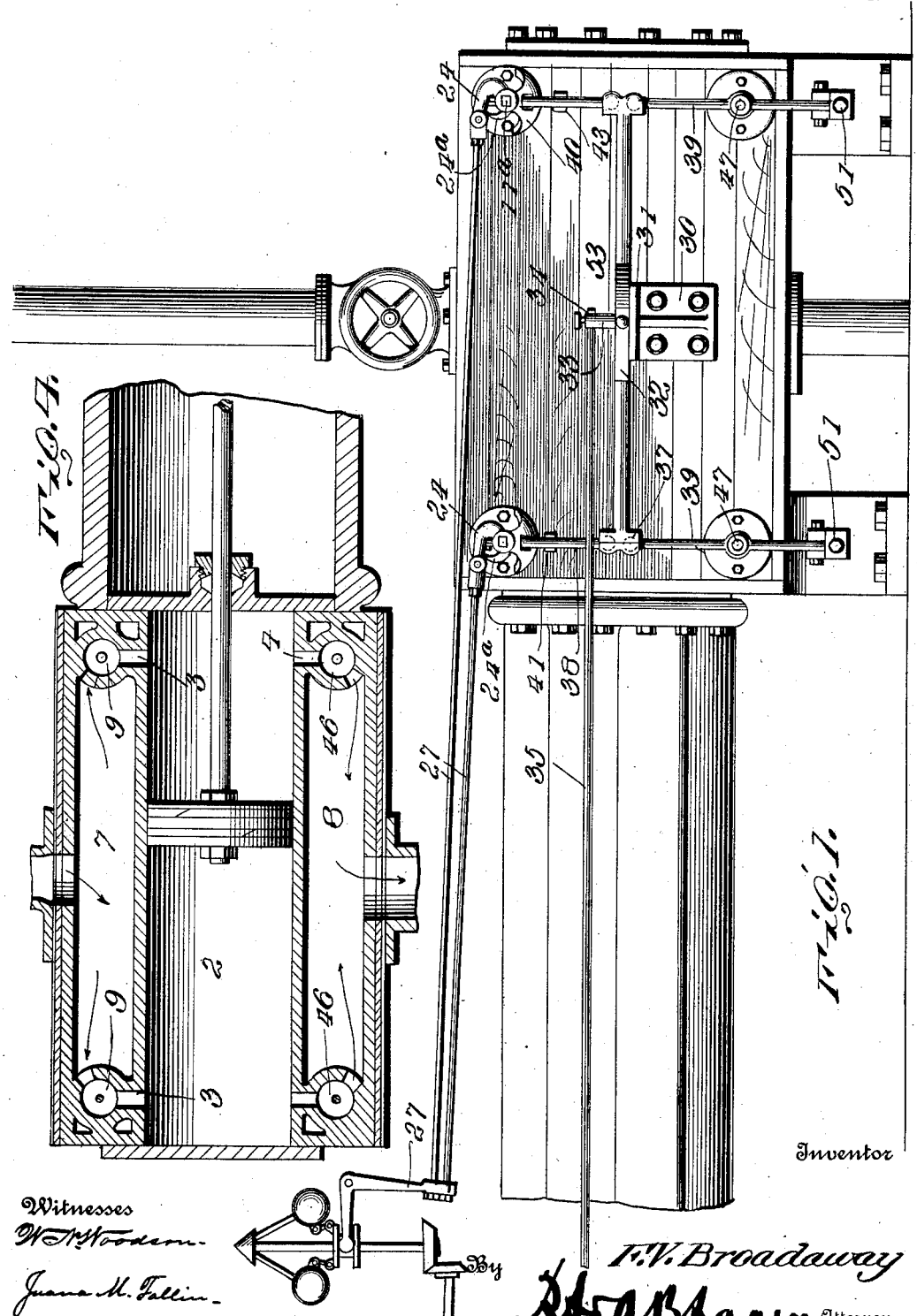

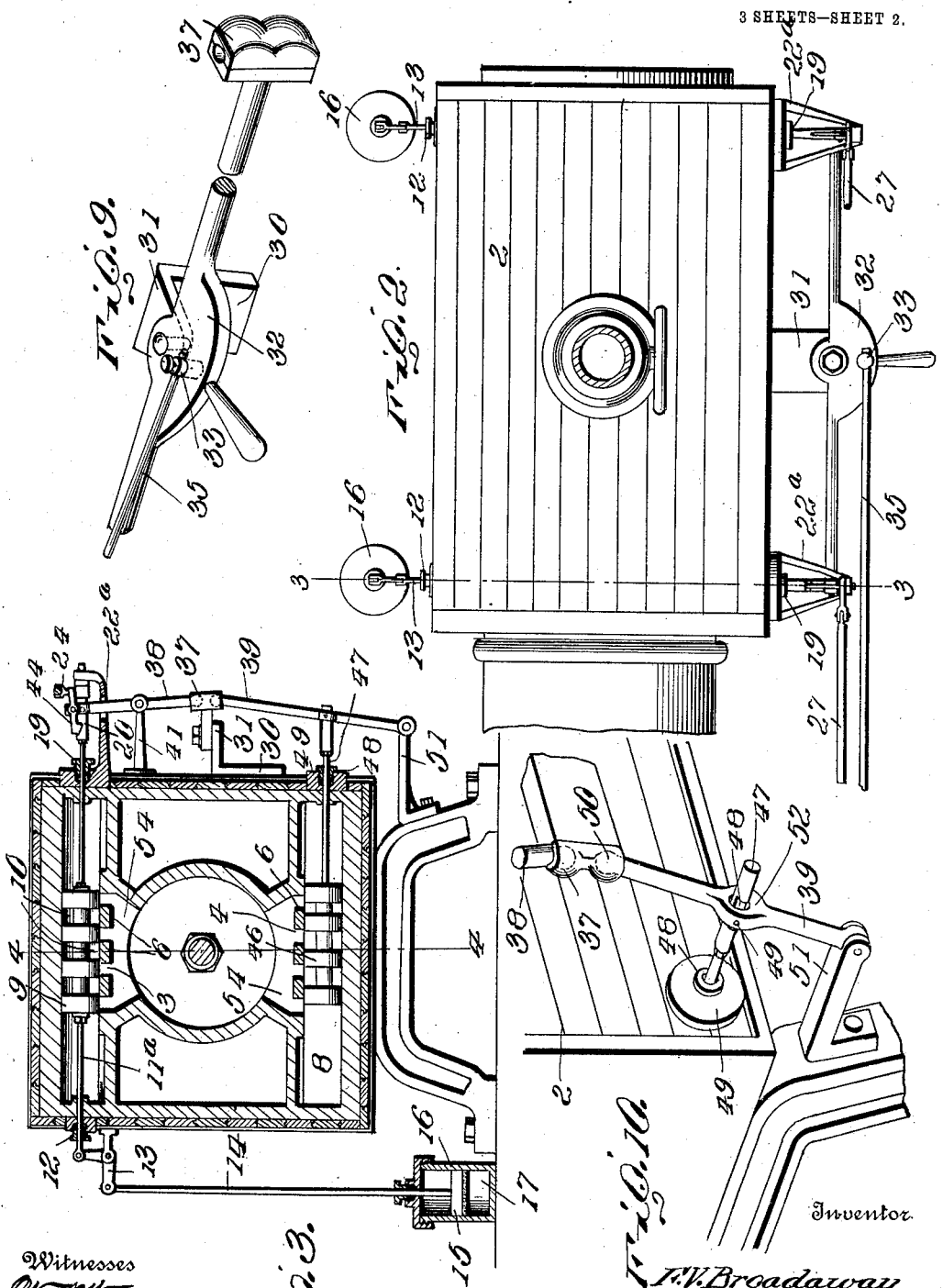

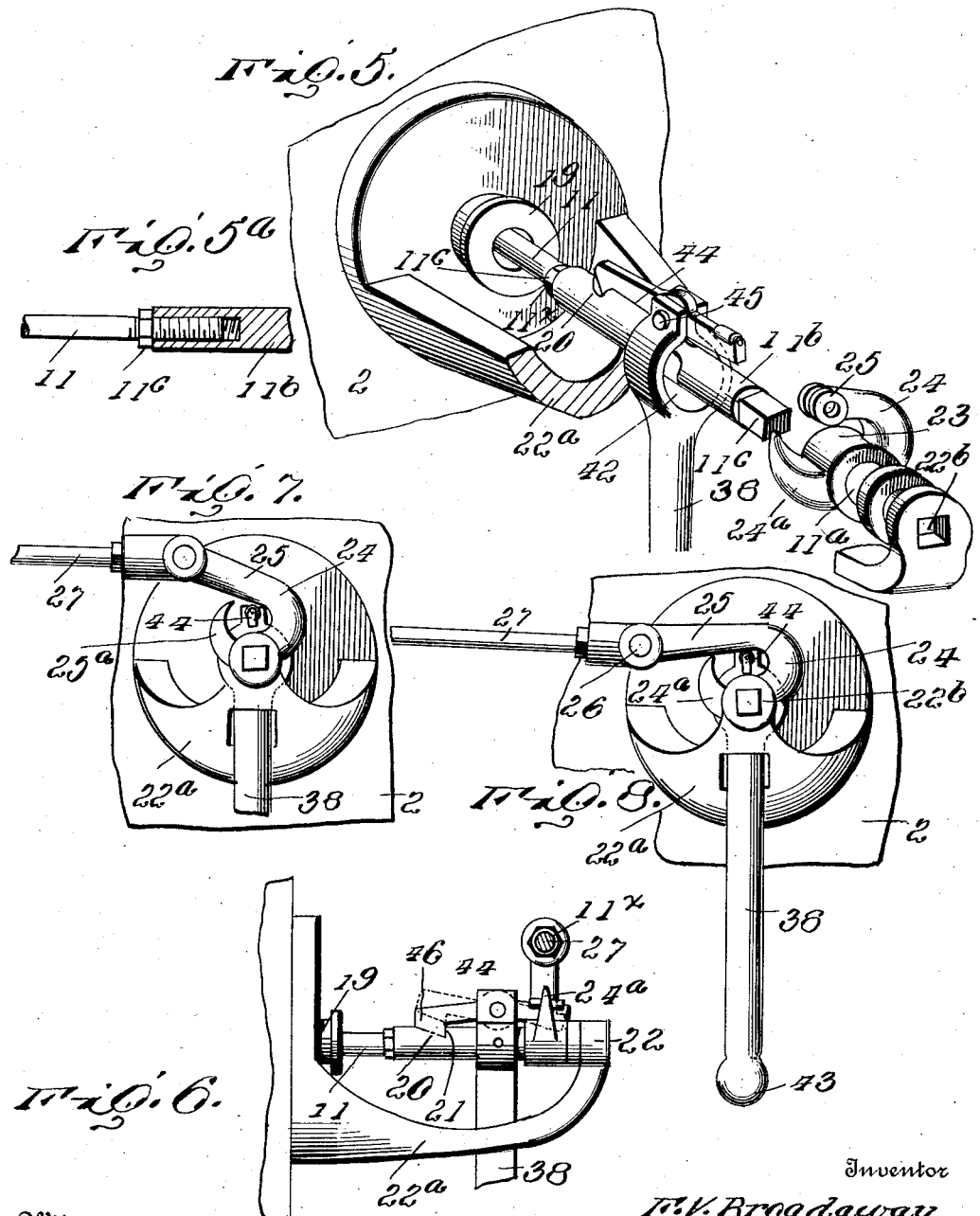

FRED V. BROADAWAY, OF HUBBARD, TEXAS.

VALVE MECHANISM FOR STEAM-ENGINES.

1,016,393. Specification of Letters Patent. Patented Feb. 6, 1912.

Application filed June 27, 1910. Serial No. 569,112.

*To all whom it may concern:*

Be it known that I, FRED V. BROADAWAY, citizen of the United States, residing at Hubbard, in the county of Hill and State of Texas, have invented certain new and useful Improvements in Valve Mechanism for Steam-Engines, of which the following is a specification.

My invention relates to valve gears of steam engines, and particularly to valve gears which are used on those engines having independent inlet valves for both ends of the cylinders, and independent exhaust valves.

The primary object of my invention is to simplify the valve gears of this class of engines, and to provide means permitting the use of balanced piston valves for controlling the inlet and exhaust of steam to and from the engine.

Another object is to provide a valve gear wherein the independent inlet valves are positively opened by connections to the eccentric of the engine, and closed by the action of a vacuum dash-pot wherein the exhaust valves are positively operated in both directions by connections to the eccentric and further wherein the amount of lap of the inlet and exhaust valves may be easily regulated to provide for any desired adjustment of cut-off or compression.

Further objects of the invention will appear in the course of the following description.

The invention is applicable to simple, compound or triple expansion engines, though in the drawings I have only shown the invention as applied to a simple engine of an ordinary type.

In these drawings: Figure 1 is a side elevation of a portion of an engine of an ordinary type showing the cylinder and steam chest therefor, together with the operating mechanism for the valves, and the rocker arm which is connected to the eccentric. Fig. 2 is a plan view of the cylinder and steam chest. Fig. 3 is a section on the line 3—3 of Fig. 2. Fig. 4 is a diagrammatic section on the line 4—4 of Fig. 3. Fig. 5 is a detail perspective view of one of the valve stems showing the latch for engaging the valve stem with the operating rod and the connection to the governor. Fig. 5ᵃ is a detail sectional view of the joint between the two sections of the valve spindle 11. Fig. 6 is a side elevation of the parts shown in Fig. 5, the connection from the governor being in section. Figs. 7 and 8 are end elevations of one of the inlet valves, these figures being designed to illustrate the action of the governor in releasing the latching device from the valve stem. Fig. 9 is a perspective detail of the pivotal support for the rocker arm. Fig. 10 is a like view of the exhaust valve connection to the operating lever.

Referring to these drawings 2 designates the cylinder of a steam engine which is provided at opposite ends with the inlet ports 3, as shown particularly in Fig. 4, and with the exhaust ports 4. These ports are relatively wide but are provided with the bridges 6 spaced from each other as illustrated in Fig. 3. On one side of the cylinder is disposed the live steam chest 7, and on the other side the exhaust steam chest 8. Both inlet valves and both exhaust valves are exactly alike, and hence a description of one of the inlet valves and one of the exhaust valves, and of the operating mechanism therefor will apply equally well for the other.

The passage of steam to each inlet port is controlled by an inlet valve 9 of the piston type having the usual circumferential steam ducts 10, equal in number to the spaces between the bridges 6. By this means a large area of port opening is secured upon a relatively short stroke of the valve. Each inlet valve is mounted on a valve stem 11, this valve stem at opposite ends extending out of the chest. Preferably, the valve stem is made in two sections 11 and 11ᵃ attached in any suitable manner at opposite ends to the valve, the section 11ᵃ extending out through a stuffing box or gland 12 and being connected to a bell crank lever 13, whereby the reciprocating movement of the valve stem in one direction is transmitted to a plunger rod 14 which at its end carries a piston head 15 moving in a vacuum dash-pot 16. One end 17 of the dash-pot is deprived of air, while the other end of the dash-pot is filled with air, thus it will be seen that upon a movement of the piston 15 in one direction the air will be compressed, and when the valve is released the compressed air on one side of the piston and the vacuum on the other will act to return the piston to its normal position, thus as shown in Fig. 3 drawing the piston 15 downward, pulling on the rod 14, and drawing upon the valve 9 so as to bring it to its closed position, that is, the position shown in Fig. 3.

The means for positively opening the valve is as follows: The rod 11 extends out through a gland or stuffing box 19 in the cap or bonnet of the valve chest. This rod is provided in its upper face with a recess 20 which has an outwardly and centrally inclined face, and an end wall 21 or shoulder at right angles to the valve stem. The extremity of the stem is square and fits in a square recess 22$^b$ formed in a collar 22 supported on a bracket 22$^a$ attached to or forming part with the bonnet of the valve chest. Surrounding the valve stem is a sleeve 23 having a curved arm 24. This arm is bent sharply as at 25 and its end is pivotally connected in any suitable manner by a pintle 26 to a rod 27 extending to a bell crank 27$^a$ connected to a governor.

The face of the steam chest is provided with a bracket or other supporting device 30 having an angularly projecting supporting flange 31 upon which is pivoted a rocker arm 32, the middle portion of which is enlarged and projects outward from the face of the valve chest. A rotatable pin 33 extends down through this outwardly projecting middle portion of the rocker arm. The pin is formed with a transversely extending passage 34 adapted for engagement with the eccentric rod 35, the eccentric rod being held in place and in its proper adjustment with the pivot pin 33 by means of a set screw or other device of like character. The rod 35 extends to an eccentric (not shown) and it will be obvious that the rotation of the eccentric or like element will act to reciprocate or oscillate the rocker arm 32 upon its pivot.

The opposite extremities of the rocker arm are provided each with a pair of sockets 37 oppositely disposed to each other for engagement with the valve-actuating levers 38 and 39, the levers 38 being for the purpose of actuating the inlet valves, and the levers 39 for the purpose of actuating the exhaust valves. Mounted upon the face of the steam chest adjacent to the heads 40 of the inlet valves are the brackets 41, each bifurcated at its extremity, for the pivotal support of one of the levers 38. The upper end of each lever 38 is split or bifurcated and enlarged so as to loosely surround one of the inlet valve stems 11. The recess or opening 42 through which the inlet valve stem passes is approximately elliptical so as to provide for a proper play of the levers 38 with relation to the valve stem. The lower end of each lever 38 is formed with a globular head 43 which is received within the sockets formed in the extremity of the rocker arm 32. The upper end of each lever 38 beyond the recess 42 through which the valve stem 11 passes, is so formed as to provide a pivotal support for a latch 44, this latch 44 being pivoted upon a pintle 45 passing through the two arms of the bifurcated portion of the lever 38. The inner end of the latch 44 is formed with a detent head 46, as shown clearly in Fig. 6, the under face of this head 46 conforming to the form of the recess 20. In other words, the under face of the detent head is inclined to conform to the inclined face 20, while the outer face of the head is straight so as to engage with the shoulder 21. It will thus be seen that upon an outward movement of the lever 38 the detent head 46 will engage with the shoulder 21, and the valve stem 11 will be drawn outward, while upon an inward movement of the upper end of the lever 38 the piston 15 in the dash-pot 16 will act to draw the valve stem inward and thus keep the shoulder 21 in engagement with the detent head 46.

I have thus provided a positive means for drawing the valve stem in one direction to open the inlet valve, and provided the dash-pot and piston for moving the valve in the reverse direction to close it. This arrangement is provided for the purpose of permitting the valve to be closed automatically when the speed is too high. To this end, I have provided the curved arm 24 connected by the rod 27 to a governor. When the speed of the engine is too great, the governor will draw upon the rods 27 which will act to turn the arm 24 into the position shown in Fig. 8. When moved into this position, the curved end of the arm will engage with the projecting extremity of the latch 44, this extremity projecting into the space between the arm 24 and the valve stem, and will thus raise the detent head 46 out of its engagement with the recess 20, whereupon the piston 15 will immediately act to close the valve or to hold it closed. It is of course to be understood that both of the inlet valves are connected to the governor, and both actuated in this manner at the same time.

As soon as the speed of the engine has decreased, the rods 27 will move in the reverse direction, thus turning the arms 24 so that the outer ends of the latches 44 will be released, and will once more engage the recesses 20 in the valve stems, whereupon the operation of the inlet valves will be continued. It will, of course, be understood that the rocker arm being pivoted at its middle reversely actuates the two inlet valves so that when one inlet valve stem is forced outward to open one inlet valve, the other valve stem will be forced inward to close the other inlet valve. The collar 23 is also provided with a claw-shaped arm 24ª which is oppositely positioned to the arm 24 and which has a curved inner face. In case the governor belt breaks and the governor slide moves downward, the rod 27 would be reversely moved, in which case the claw or arm 24ª will engage with the roller on the outer extremity of the latch 44, and depressing the outer end of the latch release the valve stem and stop the engine.

The exhaust valves 46 have practically the same construction as the inlet valves, being circumferentially channeled piston valves which are actuated by a valve stem which extends out of a gland or stuffing box 48 in a head 49, the extremity of the valve stem being connected to a lever 39. There are of course two exhaust valves located at opposite ends of the steam chest, both of these valves being precisely alike so that a description of one of the exhaust valves will apply to the other valve. The upper end of each lever 39 is with a globular head or ball 50 which is received within the corresponding socket formed on the extremity of the rocker arm 32. The lower end of the lever 39 is pivoted in a bracket 51 attached to the face of the valve chest and extending out therefrom.

Above the bracket 51 the lever 39 is formed with an elliptical, enlarged recess 52, through which loosely passes the exhaust valve stem 47. This stem is cut away on opposite sides as at 48 to accommodate the lever 39, and through the lever and through this reduced portion of the valve stem passes a pivot pin 49. It will thus be seen that a reciprocation of the lever 39 will cause a reciprocation of the corresponding valve stem 47, and that an inward movement of one end of the rocker arm will cause an outward movement of the inlet valve stem and open the inlet valve while, simultaneously therewith, there will be an inward movement of the exhaust valve to a closed position. Inasmuch as the exhaust valves are connected to the opposite ends of the rocker arm 32, these exhaust valves as well as the inlet valves, will move oppositely to each other. Thus when the inlet valve at one end of the cylinder is open, the exhaust valve at the other end of the cylinder will be opened, and vice versa.

In order to adjust the lap and lead of the exhaust and inlet valves I form the section 11 of the inlet valve and the section 17 of the exhaust valve in two parts, 11, 11ᵇ and 47 and 47ª. The part 11 is screw threaded into the sleeve 11ᵇ so that the valve stem may be shortened or lengthened as desired, and these two parts are held in their adjusted position by means of a lock nut 11ᶜ. The same construction applies to the exhaust valve stems, the part 47 screwing into the sleeve 47ª and being held in place by a lock nut. It will be understod that the inlet and exhaust valves may be adjusted so as to increase or decrease the lap and lead of the valves and may be held locked in their adjusted position. While I have shown a relatively long passage 54 leading from the valve casing to the inlet port of the engine, and a relatively long passage 55 leading from the cylinder to the exhaust valve casing, I wish it understod that as a matter of fact this passage may be extremely short and inasmuch as the passage leads directly from the cylinder to the valve casings, clearance and consequent waste of steam will be very greatly reduced, my construction of course eliminating the relatively long steam passages and clearance space which is usual to engines employing the ordinary slide valves. At the same time by the use of slide valves in place of rotary valves, I secure a much larger valve opening than would be possible with a rotary valve with a very quick action in opening or closing the valve, and by using a piston valve I secure a complete balance for the valve in a manner well known in the art.

The operation of my invention will be obvious from the description. The reciprocation of the eccentric rod causes a rocking motion of the rocker arm 32. This oscillation of the rocker arm causes each of the inlet valves to be alternately drawn outward to an open position, and alternately drawn back by means of the piston and dash-pot, thus alternately opening and closing the inlet valves and permitting steam to pass to opposite ends of the cylinder. The same operation occurs with the exhaust valves only reversely to the operation of the inlet valves, as previously stated. When the engine acquires too great speed, the governor will cause the rods 27 to be retracted, turning the sleeves 23, depressing the outer ends of the latches 44, and releasing the inlet valve stems, before described. If it were not for the necessity of providing means for releasing the valve stems by the governor, it would of course be possible to pivot the inlet valve stems directly to the extremities of the levers 38, in the same manner that the exhaust valve stems 47 are pivoted to the levers 39.

The valve gear may be disconnected from the eccentric rod by disconnecting the pivot pin 34 from the rocker arm, thus allowing the operator to shift the valves by the use of a starting bar or handle 53 which projects outward from the middle of the rocker arm radially from its pivotal point. This starting bar or handle may be used to back the engine up, or to turn the engine over slowly to warm it up before starting, and before the rocker arm is "hooked up" to the eccentric rod.

While I have shown what I believe to be a very effective form of my invention as applied to simple engines, I do not wish to be limited to this as it is obvious that many changes might be made, both in the arrangement of parts and in the details of construction without departing from the spirit of my invention.

I have illustrated the inlets to the cylinder as being formed with four ports, and the exhaust outlet from the cylinder as being provided with four ports, but I of course do not wish to be limited to this number, as any number and size of ports may be used, depending upon circumstances. When I have illustrated my valve gear as applied to a simple engine of an ordinary type, it will be obvious that it may be applied to other forms without material change.

The mechanism is also capable of use with either one or two eccentrics. Where two eccentrics are used a second rocker arm would, of course, be required. One of these eccentrics would operate the inlet valves and the other the exhaust valves. Of course two starting bars would be used for operating these eccentrics initially. When two eccentrics are used the cut-off of the exhaust valves could be regulated independent of the cut-off of the steam valves, thereby securing a more economical result.

The advantages of my invention are as follows: By using balanced piston valves I secure full port opening instantly admitting the full boiler pressure to the cylinder. By having a plurality of ports I eliminate "wire drawing." By using a positive means for opening the steam valves and then releasing said valves and closing them by means of a vacuum dash-pot, I secure a greater expansion of the steam than by other methods. Furthermore, the gear for operating the valves can be made very light on account of their being perfectly balanced and thus be very easy on the eccentric. The perfect balancing of the valves also reduces the cost of lubrication. Bushings can be easily inserted in the valve chests, or rings be placed upon the valve. By using a plurality of ports I further eliminate back pressure. The exhaust valve opens quickly and opens to its full extent immediately, thus relieving the cylinder steam instantly.

A very important feature of the invention is the fact that it permits me to use a very short passage leading from the valve chests to the cylinder, thus reducing clearness and permitting me to use the steam more economically.

What I claim is:

1. The combination with a steam cylinder having an inlet port, of an inlet valve controlling the passage of steam through said port, a reciprocating valve stem, an oscillating member operatively connected to the engine, a latch device normally connecting the oscillating member with the valve stem but disengageable therefrom to release the valve stem and permit the valve to be moved independently of the member, said latch device comprising a detent extending longitudinally of the valve stem and pivoted at its middle to the oscillating member, a governor, a sleeve loosely surrounding the valve stem and having a hooked extension extending over the free end of the detent and engageable therewith when the sleeve is rotated upon the valve stem, and a connection between the governor and the sleeve whereby the hooked extension may be rotated into or out of engagement with the free end of the latch device.

2. The combination with a steam cylinder having an inlet port, of a reciprocating valve controlling the passage of steam through said port, a valve stem, a reciprocating member operatively connected to the engine, a valve stem connected to the valve and provided with a recess on one side, said recess having an inclined bottom and an end wall at right angles to the axis of the stem, a latch pivoted to the reciprocating member and having a head at one end adapted to engage in the recess of the valve stem, the other end of said latch extending beyond its pivotal point, a governor, a sleeve mounted on the valve stem, an arm extending radially outward from the sleeve and then bent at an acute angle and extending over the projecting end of the latch, and a connection between the end of the arm and the governor, whereby the sleeve may be turned to bring the arm into engagement with the projecting end of the latch when the governor is moved in one direction to thereby release the connection between the reciprocating member and the valve stem.

3. The combination with a steam cylinder having oppositely disposed inlet ports on one side, and oppositely disposed exhaust ports on the other side, of reciprocating valves controlling the passage of steam through said ports, a rocker arm operatively connected to the engine for a reciprocatory movement, oppositely disposed levers connecting opposite ends of the rocker arm with the exhaust valves, oppositely disposed levers connecting opposite ends of the rocker arm with the inlet valves, valve stems on the inlet valves having recesses therein, latching devices mounted on the ends of the levers and normally engaging the valve stems of the inlet valves, a governor, means connected to the governor for disengaging the latching devices from the valve stems, vacuum dash-pots, and connections from said dash-pots to the inlet valves and acting to move the inlet valves to a closed position when the inlet valves are released from their engagement with the levers.

4. The combination with a steam cylinder having an inlet port, of an inlet valve controlling the passage of steam therethrough and having a valve stem, an oscillating member operatively connected to the engine, a latch device normally connecting the oscillating member with the valve stem but disengageable therefrom to release the same and permit an independent movement of the valve, a governor, a member surrounding the valve stem and having oppositely projecting hooked extensions partially surrounding the valve stem, said extensions being respectively engageable with the latch device to release it when the sleeve is rotated in either direction upon the valve stem, and a connection between the governor and said sleeve acting to rotate the sleeve when the governor is moved beyond a predetermined point in either direction.

5. The combination with a steam cylinder having an inlet port, of an inlet valve controlling the passage of steam therethrough and having a valve stem, an oscillating member bifurcated at its end to loosely embrace the valve stem, a latch pivotally mounted upon the bifurcated end of the oscillating member and normally engaging the valve stem but disengageable therefrom, a governor, a sleeve loosely surrounding the valve stem and having an extension normally projecting over the latch device and engageable therewith when the sleeve is rotated upon the valve stem, and a connection between the governor and the sleeve.

6. The combination with a steam cylinder having an inlet port, of an inlet valve controlling the passage of steam through said port, said valve having a valve stem, an oscillating member operatively connected to the engine and having a bifurcated end loosely embracing the valve stem, a latch pivoted midway its ends in the bifurcated end of the oscillating member and having a head normally engaging the valve stem, a sleeve loosely surrounding the valve stem and held in operative relation to the latch, a curved extension projecting from one side of said sleeve, a curved projection extending from the other side of said sleeve and curved toward the first projection, said projections being adapted to extend over the free end of the latch to depress the same when the sleeve is rotated in either direction upon the valve stem, and a connection between the governor and the sleeve whereby the sleeve may be rotated in either direction upon a movement of the governor in either direction beyond a predetermined point.

7. The combination with a steam cylinder and a valve chest connected thereto, said steam cylinder having oppositely disposed inlet ports on one side, and oppositely disposed exhaust ports on the other side thereof, reciprocating valves controlling the passage of steam through said ports, a rocker arm pivoted at its middle and operatively connected to the engine for reciprocatory movement, said rocker arm extending longitudinally of the valve chest, oppositely disposed pairs of levers, each lever having a universal joint connection at its inner end with the adjacent end of said rocker arm, one of each pair of levers being connected to one of the inlet valves and the other of the same pair of levers being connected to one of the outlet valves.

8. The combination with a steam cylinder, a valve chest connected thereto, said cylinder having oppositely disposed inlet ports on one side and oppositely disposed exhaust ports on the other side, of shiftable valves controlling the passage of steam through said ports, a rocker arm pivoted at its middle and having a projecting handle, an operating connection for the rocker arm but detachable therefrom, oppositely disposed pairs of levers connected to the extremities of the operating arm, one of each pair of levers being connected to one of the inlet valves and the other of the same pair of levers being connected to one of the outlet valves.

9. The combination with a reciprocating valve having a projecting stem, of a reciprocating lever bifurcated at one end and embracing the stem, a latch pivoted at its middle upon the bifurcated end of the lever and having a detent end engaging the recess in the valve stem, a sleeve mounted upon the valve stem and rotatable thereon, a hooked arm on the sleeve extending over the free end of the latch, the hooked arm being normally out of engagement with the latch but engageable therewith to depress the free end thereof upon a rotation of the sleeve in one direction, a governor, and a connection between the governor and the sleeve whereby the latter may be rotated in one or the other direction by an actuation of the governor.

10. The combination with a steam cylinder and a valve chest connected thereto, of a reciprocating valve in the valve chest having a stem projecting through the valve chest, a reciprocating member, a tubular member pivotally connected to the reciprocating member and having screw threaded engagement with the stem whereby the valve may be adjusted relative to the reciprocating member.

11. The combination with a valve chest and a reciprocating valve therein having a stem projecting out through the valve chest, of a reciprocating member bifurcated at one end and loosely embracing the valve stem, a latch pivoted at its middle to the bifurcated end of the reciprocating member and having a detent end normally engaging the valve stem with the reciprocating member, a rotatable sleeve on the valve stem, reversely disposed hooked portions on the sleeve adapted when the sleeve is rotated in one or the other direction to engage over the free end of the latch and depress the same to release the valve stem from its engagement with the reciprocating member, and governor actuated means for controlling the rotation of the sleeve.

In testimony whereof, I affix my signature in presence of two witnesses.

FRED V. BROADAWAY. [L. S.]

Witnesses:
M. TOMEK,
J. C. MECKLIN.

Copies of this patent may be obtained for five cents each, by addressing the "Commissioner of Patents, Washington, D. C."